US012801162B2

(12) United States Patent
Ishizuka et al.

(10) Patent No.: US 12,801,162 B2
(45) Date of Patent: Nov. 17, 2026

(54) INFORMATION PROCESSING APPARATUS FOR SPECIFYING A DWELLING UNIT IN A HOUSING COMPLEX AS A DESTINATION OF A FLIGHT VEHICLE

(71) Applicant: NTT DOCOMO, INC., Tokyo (JP)

(72) Inventors: Hiroki Ishizuka, Tokyo (JP); Masashi Anzawa, Tokyo (JP); Masaki Morishita, Tokyo (JP); Keisuke Nakashima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 294 days.

(21) Appl. No.: 18/689,234

(22) PCT Filed: Aug. 19, 2022

(86) PCT No.: PCT/JP2022/031295
§ 371 (c)(1),
(2) Date: Aug. 21, 2024

(87) PCT Pub. No.: WO2023/042601
PCT Pub. Date: Mar. 23, 2023

(65) Prior Publication Data

US 2025/0334976 A1 Oct. 30, 2025

(30) Foreign Application Priority Data

Sep. 16, 2021 (JP) ................................. 2021-150927

(51) Int. Cl.
*G05D 1/654* (2024.01)
*B64U 101/32* (2023.01)
(Continued)

(52) U.S. Cl.
CPC ............. *G05D 1/654* (2024.01); *G05D 1/243* (2024.01); *G06Q 10/0836* (2013.01); *G06T 7/70* (2017.01);
(Continued)

(58) Field of Classification Search
CPC ............... G05D 1/654; G05D 2105/20; G05D 2107/40; G05D 2109/20; G05D 2111/10;
(Continued)

(56) References Cited

U.S. PATENT DOCUMENTS

2021/0073715 A1 3/2021 Yamada et al.
2021/0174301 A1* 6/2021 Abeywardena ...... G05D 1/0044

FOREIGN PATENT DOCUMENTS

JP 2020057225 A * 4/2020
JP 6741073 B2 8/2020
(Continued)

OTHER PUBLICATIONS

WO 2018078859 Nakaya original and machine translation (Year: 2018).*
(Continued)

*Primary Examiner* — Michael V Kerrigan
*Assistant Examiner* — Zachary E. F. Glade
(74) *Attorney, Agent, or Firm* — DILWORTH IP, LLC

(57) ABSTRACT

An acquisition unit acquires data indicating a result of detecting a shape of a housing complex that includes a target dwelling unit that is a destination of a drone. An acquisition unit acquires shape information regarding the shape of the housing complex, and positional information regarding a position of the target dwelling unit in the housing complex. A determination unit determines whether or not the housing complex reached by the drone is the housing complex that includes the target dwelling unit by comparing the detection result of detecting the shape of the housing complex reached based on the position of the drone with the acquired shape information. A specifying unit specifies the position of the target dwelling unit in the housing complex when the
(Continued)

housing complex reached based on the position of the drone is determined to be the housing complex that includes the target dwelling unit.

8 Claims, 5 Drawing Sheets

(51) Int. Cl.

| | |
|---|---|
| ***G05D 1/243*** | (2024.01) |
| ***G05D 105/20*** | (2024.01) |
| ***G05D 105/28*** | (2024.01) |
| ***G05D 107/17*** | (2024.01) |
| ***G05D 107/40*** | (2024.01) |
| ***G05D 109/20*** | (2024.01) |
| ***G05D 109/25*** | (2024.01) |
| ***G05D 111/10*** | (2024.01) |
| ***G06Q 10/0836*** | (2023.01) |
| ***G06T 7/70*** | (2017.01) |
| ***G08G 5/22*** | (2025.01) |
| ***G08G 5/26*** | (2025.01) |
| ***G08G 5/54*** | (2025.01) |
| ***G08G 5/55*** | (2025.01) |
| ***G08G 5/57*** | (2025.01) |
| ***G08G 5/90*** | (2025.01) |

(52) U.S. Cl.

CPC ................. *G08G 5/54* (2025.01); *G08G 5/55* (2025.01); *G08G 5/57* (2025.01); *G08G 5/90* (2025.01); *B64U 2101/32* (2023.01); *G05D 2105/20* (2024.01); *G05D 2105/285* (2024.01); *G05D 2107/17* (2024.01); *G05D 2107/40* (2024.01); *G05D 2109/20* (2024.01); *G05D 2109/254* (2024.01); *G05D 2111/10* (2024.01); *G06T 2207/10032* (2013.01); *G06T 2207/30184* (2013.01); *G06T 2207/30242* (2013.01); *G08G 5/22* (2025.01); *G08G 5/26* (2025.01)

(58) Field of Classification Search

CPC ............. G06T 7/70; G06T 2207/10032; G06T 2207/30184; G06T 2207/30242; B64C 13/18; B64C 27/04; B64C 39/02; G06Q 50/10; G08G 5/54

See application file for complete search history.

(56) References Cited

FOREIGN PATENT DOCUMENTS

| | | | | |
|---|---|---|---|---|
| WO | WO-2018078859 A1 * | 5/2018 | ............. | G05D 1/106 |
| WO | WO-2019055690 A1 * | 3/2019 | ........... | B64C 39/024 |
| WO | WO-2019146576 A1 * | 8/2019 | ............. | G06Q 10/08 |

OTHER PUBLICATIONS

JP-2020057225 Ohashi original and machine translatio (Year: 2020).*

WO-2019146576 Yamada original and machine translation (Year: 2019).*

International Search Report issued in PCT Application No. PCT/JP2022/031295, mailed on Oct. 11, 2022.

Office Action received for Japanese Patent Application No. 2023-548372, mailed on Jan. 13, 2026, 10 pages (6 pages of English Translation and 4 pages of Original Document).

* cited by examiner

INFORMATION PROCESSING APPARATUS FOR SPECIFYING A DWELLING UNIT IN A HOUSING COMPLEX AS A DESTINATION OF A FLIGHT VEHICLE

TECHNICAL FIELD

The present invention relates to a technique for specifying a dwelling unit that is the destination of a flight vehicle in a housing complex.

BACKGROUND

With the spread of unmanned flight vehicles called drones, various mechanisms have been proposed to use drones to deliver packages. For example, Japanese Patent Application No. JP 6741073B discloses that an unmanned flight vehicle measures the received signal strength of a beacon signal received from a beacon apparatus placed on the balcony of the dwelling unit at a delivery destination or collection destination in a housing complex such as a condominium or apartment, and the unmanned flight vehicle moves in the direction where the received signal strength is maximum, and lands.

SUMMARY OF INVENTION

The mechanism in Japanese Application No. JP 6741073B requires dedicated equipment called a beacon apparatus to be installed at the destinations of drones. However, when drones are used to deliver packages, for example, it is difficult to always have this type of dedicated equipment installed in every dwelling unit that can serve as the destination.

Therefore, an object of the present invention is to specify a target dwelling unit that is the destination of a flight vehicle without installing equipment such as a beacon apparatus at the destination of the flight vehicle.

The present invention provides an information processing apparatus including: an acquisition unit that acquires shape information on a shape of a housing complex including a target dwelling unit that is a destination of a flight vehicle, and location information on a location of the target dwelling unit in the housing complex; a determination unit that determines, by comparing a result of detecting a shape of a housing complex reached by the flight vehicle based on positioning with the shape information acquired by the acquisition unit, whether the housing complex is the housing complex including the target dwelling unit; and a specifying unit that specifies, upon determining that the housing complex is the housing complex including the target dwelling unit, the location of the target dwelling unit in the housing complex based on the location information acquired by the acquisition unit.

According to the present invention, it is possible to specify a target dwelling unit that is the destination of a flight vehicle without installing equipment such as a beacon apparatus at the destination of the flight vehicle.

DETAILED DESCRIPTION

Configuration

Figure 1:
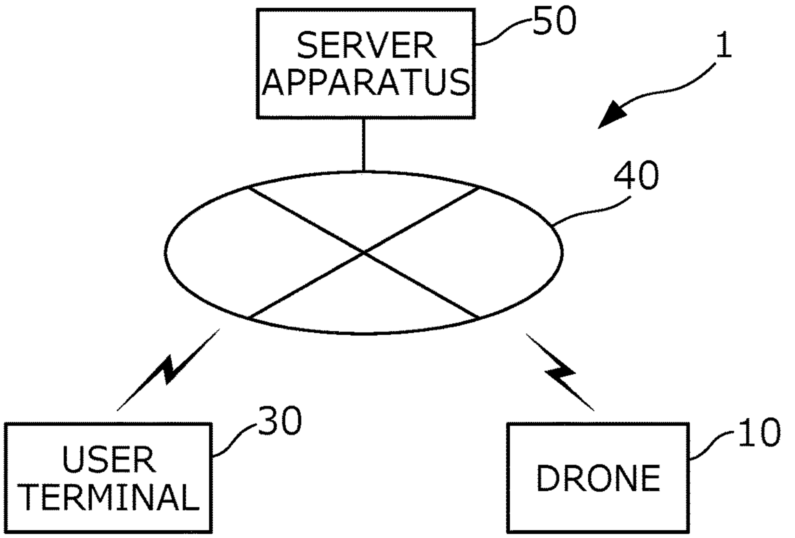
FIG. 1 is a block diagram showing an example of a configuration of drone management system 1 according to an embodiment of the present invention.

FIG. 1 is a diagram showing an example of a configuration of drone management system 1 according to an embodiment of an information processing system according to the present invention. Drone management system 1 includes drone 10 that transports a package to a destination, user terminal 30 used by a user residing in a dwelling unit that is the destination of drone 10, wireless communication network 40, and server apparatus 50 connected to wireless communication network 40. Although FIG. 1 shows a single drone 10, a single user terminal 30, a single wireless communication network 40, and a single server apparatus 50, there may be a plurality of each.

Drone 10 is an unmanned flight vehicle that flies in the air. Drone 10 transports a package by flying to the destination while holding the package, and landing at the destination.

User terminal 30 is, for example, a communicable computer such as a smartphone, a tablet, or a personal computer. In the present embodiment, user terminal 30 is a smartphone, and functions as a communication terminal through which the user receiving a package receives various notifications from server apparatus 50 and accesses server apparatus 50 via wireless communication network 40.

Wireless communication network 40 may be, for example, equipment compliant with the fourth-generation mobile communication system, or equipment compliant with the fifth-generation mobile communication system. Drone 10, user terminal 30, and server apparatus 50 communicate with each other via wireless communication network 40.

Server apparatus 50 stores pieces of flight plan information such as flight date and time, a flight route, and a flight altitude of drone 10, and remotely controls drone 10 in accordance with the pieces of flight plan information. The remote control by server apparatus 50 is mainly performed in the section between the departure and arrival point of drone 10, called the base, and an area above the destination of drone 10. Drone 10 flies under autonomous control by drone 10 itself in the section between the area above the destination and the landing point of drone 10. The dwelling unit that is the destination of drone 10 (hereinafter referred to as the "target dwelling unit") is one of a plurality of dwelling units included in a housing complex such as a condominium or apartment. Each dwelling unit included in such a housing complex has the same address, from the prefecture to the street number, and their appearance is often almost the same. Therefore, how to specify the target dwelling unit that is the destination of the drone from the housing complex is an important issue.

Therefore, in the present embodiment, the shape of the housing complex reached by drone 10 is detected, and this detection result and information regarding the shape of the housing complex including the target dwelling unit prepared in advance and information regarding the position of the target dwelling unit in the housing complex are used to specify the position of the target dwelling unit.

In the present embodiment, as described above, the drone relies on the remote control by server apparatus 50 in the section between the departure and arrival point and the area above the destination of the drone, and flies autonomously in the section between the area above the destination and the landing position of the drone. However, the present invention is not limited to this example. For example, drone 10 may autonomously fly all of the sections between the departure and arrival point and the landing position at the destination without relying on the remote control by server apparatus 50, or fly under the remote control by server apparatus 50 in all of the sections between the departure and arrival point and the landing position at the destination.

Figure 2:
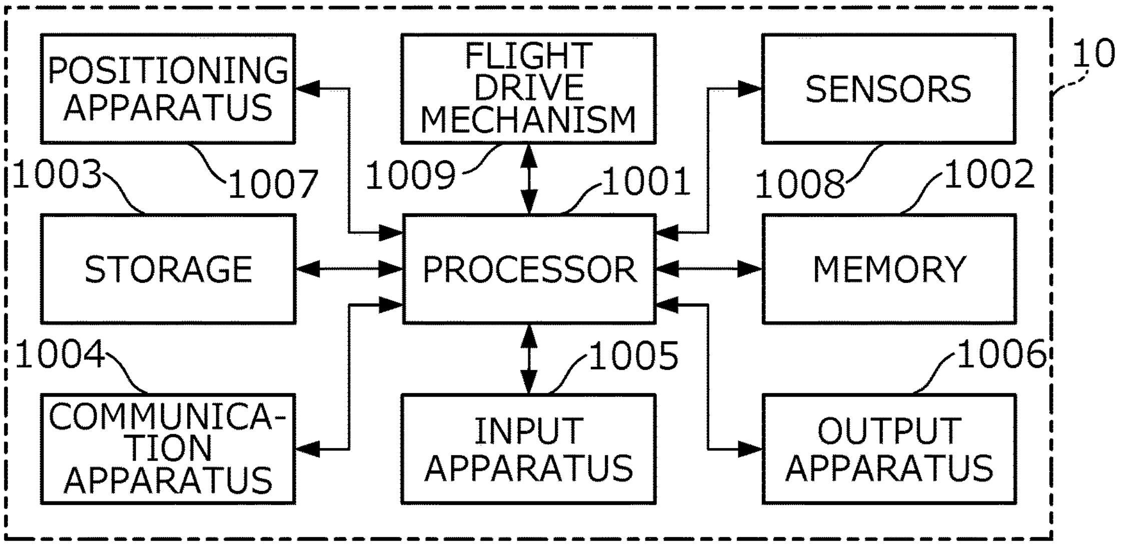
FIG. 2 is a block diagram showing an example of a hardware configuration of drone 10 according to one embodiment.

FIG. 2 is a diagram showing an example of a hardware configuration of drone 10. Drone 10 is formed as a computer apparatus physically including processor 1001, memory 1002, storage 1003, communication apparatus 1004, input apparatus 1005, output apparatus 1006, positioning apparatus 1007, sensors 1008, flight drive mechanism 1009, a bus connecting these components, and so on. In the following description, the term "apparatus" can be read as circuit, device, unit, or the like. In the hardware configuration of drone 10, each of the apparatuses shown in the figure may be provided in singularity or in plurality, and some of the apparatuses may be omitted.

Each function of drone 10 is realized by loading predetermined software (programs) into hardware such as processor 1001 and memory 1002 so that processor 1001 performs computations to control communication performed by communication apparatus 1004, to control at least either reading data from or writing data to memory 1002 and storage 1003, or to control positioning apparatus 1007, sensors 1008, and flight drive mechanism 1009.

Processor 1001 runs an operating system to control the entire computer, for example. Processor 1001 may be constituted by a central processing unit (CPU) that includes an interface with a peripheral apparatus, a control apparatus, a computation apparatus, a register, and so on. In addition, for example, a baseband signal processing unit, a call processing unit, and so on may be realized by processor 1001.

Processor 1001 reads out programs (program codes), software modules, data, and so on from at least one of storage 1003 and communication apparatus 1004 into memory 1002 and performs various kinds of processing in accordance with the programs. Programs that enable a computer to execute at least some of the operations described below are used as the aforementioned programs. The functional blocks of drone 10 may be realized by control programs stored in memory 1002 and executed by processor 1001. The various kinds of processing may be performed by a single processor 1001, but may also be performed by two or more processors 1001 simultaneously or sequentially. Processor 1001 may be implemented using one or more chips. The programs may be transmitted to drone 10 via wireless communication network 40.

Memory 1002 is a non-transitory, computer-readable recording medium, and may be constituted by at least one of a ROM, an EPROM (Erasable Programmable ROM), an EEPROM (Electrically Erasable Programmable ROM), a RAM, and so on. Memory 1002 may also be referred to as a register, a cache, a main memory (main storage apparatus), or the like. Memory 1002 is capable of storing executable programs (program codes), software modules, and so on to implement the method according to the present embodiment.

Storage 1003 is a non-transitory, computer-readable recording medium, and may be constituted by at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and so on. Storage 1003 may also be referred to as an auxiliary storage apparatus. Storage 1003 stores various programs and a data group.

Processor 1001, memory 1002, and storage 1003 described above function as an example of the information processing apparatus according to the present invention.

Communication apparatus 1004 is hardware (a transmission and reception device) for communication between computers via wireless communication network 40, and is also referred to as, for example, a network device, a network controller, a network card, a communication module, or the like. Communication apparatus 1004 includes a high frequency switch, a duplexer, a filter, a frequency synthesizer, and so on in order to realize frequency division duplexing and time division duplexing. A transmission and reception antenna, an amplifier unit, a transmission and reception unit, a propagation path interface, and so on may be realized by communication apparatus 1004. The transmission and reception unit may be implemented as a transmitting unit and a receiving unit that are physically or logically separated from each other.

Input apparatus 1005 is an input device that accepts input from an external apparatus, and examples thereof include keys, switches, microphones, and so on. Output apparatus 1006 is an output device that performs output to an external apparatus, and examples thereof include a display apparatus such as a liquid crystal display, a speaker, and so on. Input apparatus 1005 and output apparatus 1006 may be integrated.

Positioning apparatus 1007 is hardware for measuring the position of drone 10, and is a GPS (Global Positioning System) device, for example. Drone 10 flies from the departure and arrival point to the area above the destination based on positioning by positioning apparatus 1007.

Sensors 1008 include various sensors such as a ranging sensor that functions as an altitude measuring means for measuring the altitude of drone 10 and a status checking means for checking the status of the landing position, a gyro sensor and a direction sensor that function as an attitude measuring means for measuring the attitude of drone 10, an image sensor that functions as a detection means, and so on. Note that the apparatuses functioning as the altitude measuring means, the status checking means, the attitude measuring means, and the detection means are not limited to the above-described examples of sensors. For example, the detection means is not limited to an image sensor, but may also be a Lidar (light detection and ranging) apparatus or the like. In short, any technology for remotely sensing the characteristics of the shape of a housing complex that includes a plurality of dwelling units can be used.

Flight drive mechanism 1009 includes hardware such as a motor and a propeller for drone 10 to fly.

The apparatuses such as processor 1001 and memory 1002 are connected by a bus for information communication. The bus may be constituted by a single bus, or formed using a different bus for each pair of apparatuses. In addition, drone 10 may include hardware such as a microprocessor, a GPU (Graphics Processing Unit), a digital signal processor (DSP), an ASIC (Application Specific Integrated Circuit), a PLD (Programmable Logic Device), an FPGA (Field Programmable Gate Array), and so on, and part or all of each functional block may be realized by such hardware. For example, processor 1001 may be implemented using at least one of these pieces of hardware.

Figure 3:
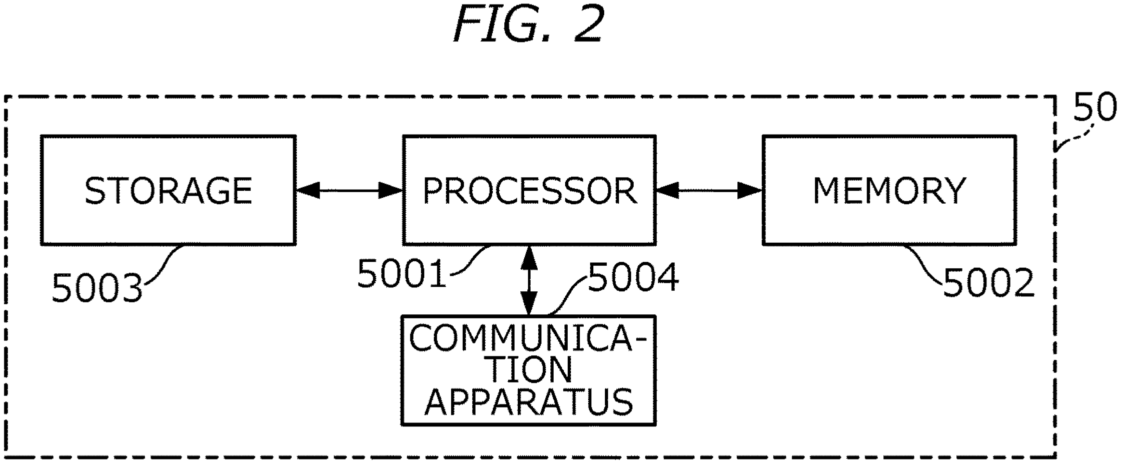
FIG. 3 is a block diagram showing an example of a hardware configuration of server apparatus 50 according to one embodiment.

FIG. 3 is a diagram showing a hardware configuration of server apparatus 50. In the hardware configuration of server apparatus 50, each of the apparatuses shown in FIG. 3 may be provided in singularity or in plurality, and some of the apparatuses may be omitted. Alternatively, server apparatus 50 may be formed by communicatively connecting a plurality of devices each having a different housing.

Server apparatus 50 is formed as a computer apparatus physically including processor 5001, memory 5002, storage 5003, communication apparatus 5004, a bus connecting these components, and so on. Each function of server apparatus 50 is realized by loading predetermined software (programs) into hardware such as processor 5001 and memory 5002 so that processor 5001 performs computations to control communication performed by communication apparatus 5004, or to control at least either reading data from or writing data to memory 5002 and storage 5003. These apparatuses are powered by a power source (not shown).

Processor 5001 runs an operating system to control the entire computer, for example. Processor 5001 may be constituted by a central processing unit (CPU) that includes an interface with a peripheral apparatus, a control apparatus, a computation apparatus, a register, and so on. In addition, for example, a baseband signal processing unit, a call processing unit, and so on may be realized by processor 5001.

Processor 5001 reads out programs (program codes), software modules, data, and so on from at least one of storage 5003 and communication apparatus 5004 into memory 5002 and performs various kinds of processing in accordance with the programs. Programs that enable a computer to execute at least some of the operations described below are used as the aforementioned programs. The functional blocks of server apparatus 50 may be realized by control programs stored in memory 5002 and executed by processor 5001. The various kinds of processing may be performed by a single processor 5001, but may also be performed by two or more processors 5001 simultaneously or sequentially. Processor 5001 may be implemented using one or more chips.

Memory 5002 is a non-transitory, computer-readable recording medium, and may be constituted by at least one of a ROM, an EPROM, an EEPROM, a RAM, and so on. Memory 5002 may also be referred to as a register, a cache, a main memory (main storage apparatus), or the like. Memory 5002 is capable of storing executable programs (program codes), software modules, and so on to implement the method according to the present embodiment.

Storage 5003 is a non-transitory, computer-readable recording medium, and may be constituted by at least one of an optical disk such as a CD-ROM, a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and so on. Storage 5003 may also be referred to as an auxiliary storage apparatus.

Storage 5003 stores programs and data groups used to perform the various kinds of processing described below. The data groups stored in the storage 5003 include shape information regarding the shape of the housing complex that includes the target dwelling unit that is the destination of drone 10. This shape information is data representing the external shape of the housing complex that can be observed from the outside of the housing complex. The data format of this shape information is not particularly limited, and may be represented as three-dimensional data compliant with a scheme such as BIM (Building Information Modeling), CIM (Construction Information Modeling), or CAD (Computer-Assisted/Aided Drafting). In addition, the data groups stored in storage 5003 include positional information (location information) regarding the position (location) of the target dwelling unit in the housing complex that includes the target dwelling unit that is the destination of drone 10. This positional information is data used to specify the position of the target dwelling unit from the outside of the housing complex. The data format of this positional information is not particularly limited, and may be represented by designating the position of the target dwelling unit in the positional information compliant with a scheme such as the above-described BIM, CIM, or CAD.

Communication apparatus 5004 is hardware (a transmission and reception device) for communication between computers via wireless communication network 40, and is also referred to as, for example, a network device, a network controller, a network card, a communication module, or the like.

The apparatuses such as processor 5001 and memory 5002 are connected by a bus for information communication. The bus may be constituted by a single bus, or formed using a different bus for each pair of apparatuses.

Server apparatus 50 may include hardware such as a microprocessor, a digital signal processor, an ASIC, a PLD, an FPGA, and so on, and part or all of each functional block may be realized by such hardware. For example, processor 5001 may be implemented using at least one of these pieces of hardware.

Figure 4:
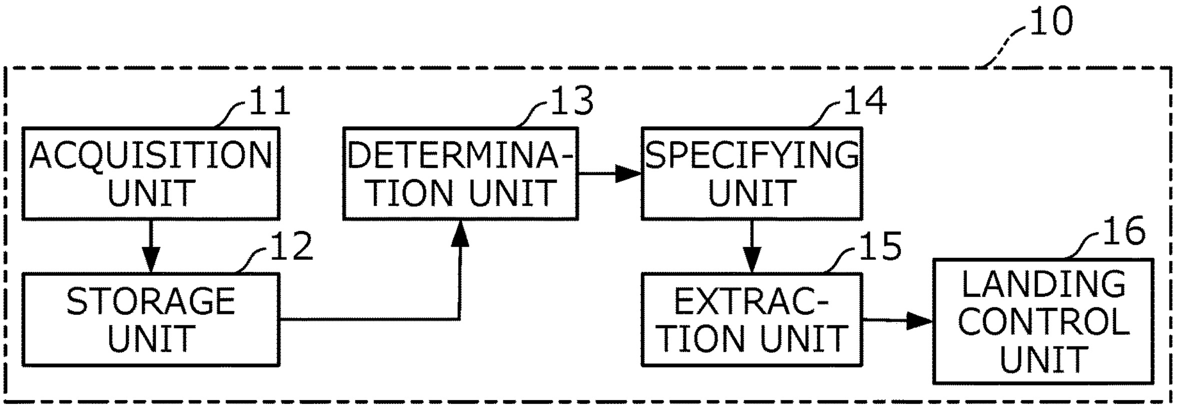
FIG. 4 is a block diagram showing an example of a functional configuration of drone 10.

FIG. 4 is a diagram illustrating, in particular, a functional configuration of drone 10 for specifying the position of the target dwelling unit, included in the functional configuration of the drone. As shown in FIG. 4, the functions of acquisition unit 11, storage unit 12, determination unit 13, specifying unit 14, extraction unit 15, and landing control unit 16 are realized in drone 10.

Acquisition unit 11 acquires various kinds of data from positioning apparatus 1007, sensors 1008, server apparatus 50, and so on. For example, acquisition unit 11 acquires data indicating a detection result of sensors 1008 detecting the shape of the housing complex that includes the target dwelling unit that is the destination of drone 10. In addition, acquisition unit 11 acquires shape information regarding the shape of the housing complex that includes the target dwelling unit that is the destination of drone 10, and positional information regarding the position of the target dwelling unit in the housing complex from server apparatus 50 via wireless communication network 40.

Storage unit 12 stores the data groups acquired by acquisition unit 11, as well as programs and data groups used to execute the various kinds of processing described below.

Determination unit 13 determines whether or not the housing complex reached by drone 10 is the housing complex that includes the target dwelling unit that is the destination of drone 10 by comparing the result of the detection by sensors 1008 regarding the shape of the housing complex reached by drone 10 based on the position of drone 10 with the shape information acquired by acquisition unit 11. More specifically, determination unit 13 compares the detection result of sensors 1008 detecting the shape of the housing complex reached by drone 10, from above the housing complex, with the shape information acquired by acquisition unit 11, to determine whether or not the housing complex is the housing complex that includes the target dwelling unit that is the destination of drone 10.

Figure 5:
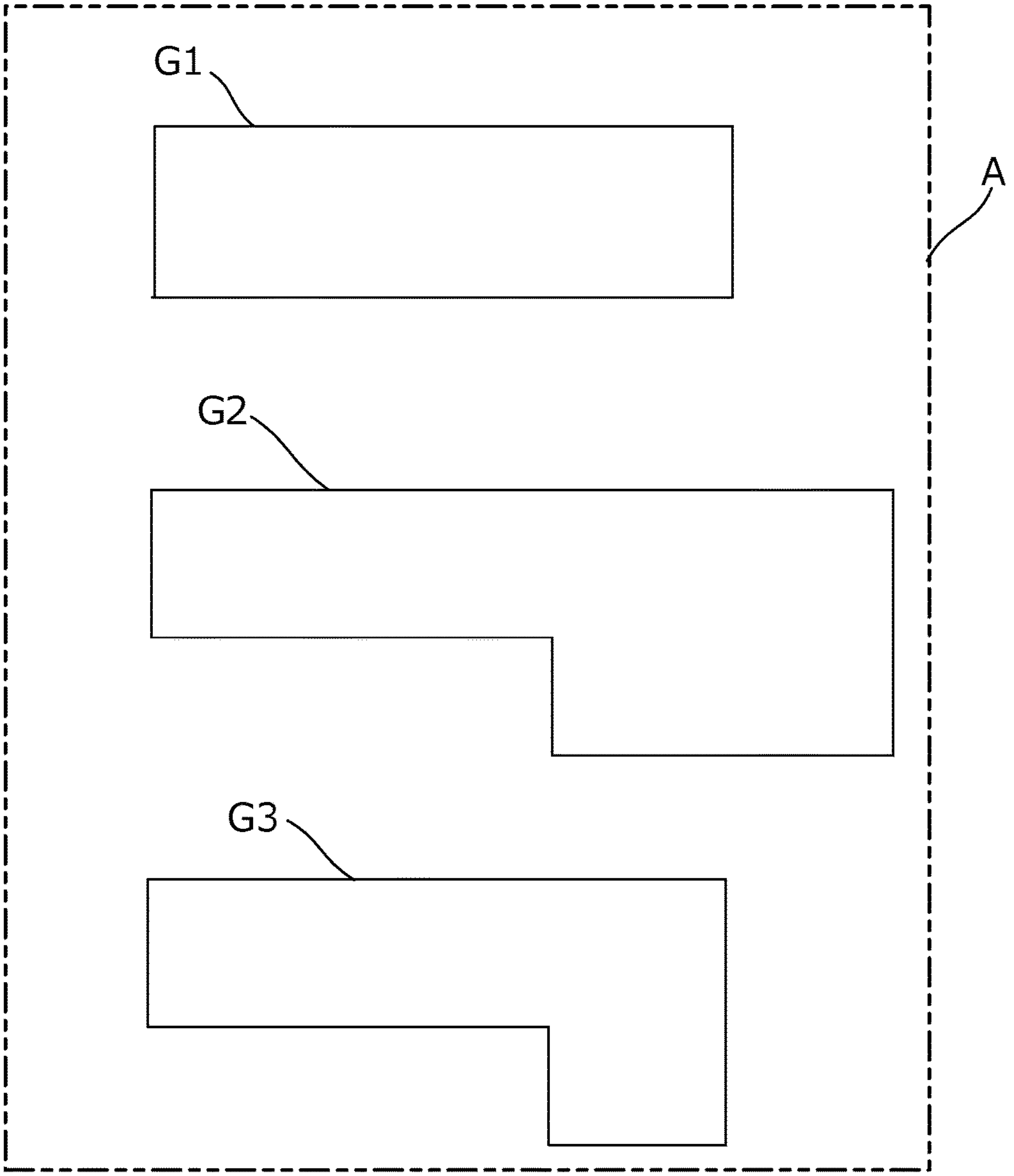
FIG. 5 is a plan view illustrating a shape of a housing complex that includes a target dwelling unit that is a destination of drone 10 according to one embodiment.

Here, FIG. 5 is a plan view illustrating the shape of the housing complex that includes the target dwelling unit that is the destination of drone 10, observed from above the housing complex. In this example, three housing complexes G1, G2, and G3 (residential buildings) exist within site A corresponding to the same address. The shapes of housing complexes G1 to G3 viewed from above are different, and therefore, determination unit 13 can determine which housing complex includes the target dwelling unit that is the destination of drone 10 by comparing the shape information acquired in advance from server apparatus 50 with the shapes of housing complexes G1 to G3 viewed from above (in this example, the detection result of sensors 1008).

When detecting the shape of a housing complex, drone 10 does not need to attempt detection with sensors 1008 from a certain high position where the entire shape of one housing complex can be detected at once. For example, the shape of the housing complex may be detected with sensors 1008 over a certain period of time while drone 10 is flying horizontally above the housing complex. This applies not only to cases where the shape of a housing complex is detected from above, but also to cases where the shape is detected from a side.

Furthermore, not only when a plurality of housing complexes exist on the site corresponding to the same address as illustrated in FIG. 5, but also when only one housing complex exists on the site corresponding to the same address, determination unit 13 can determine whether or not the housing complex is the housing complex that includes the target dwelling unit by comparing the shape information acquired from server apparatus 50 with the shape of the housing complex detected from above. In addition, there are cases where the plurality of housing complexes on the site corresponding to the same address have almost the same shape but different sizes. In such cases, the shape information acquired from server apparatus 50 may include information regarding the sizes of the housing complexes, and determination unit 13 may compare the shape information with the size of the housing complex when the shape thereof is detected from above to determine whether or not the housing complex is the housing complex that includes the target dwelling unit. Alternatively, the shape information acquired from server apparatus 50 may include information regarding the relationship between the shape and the orientation of the housing complex, and determination unit 13 may compare the shape information with the shape and the orientation of the housing complex detected from above to determine whether or not the housing complex is the housing complex that includes the target dwelling unit. For example, when a housing complex has a shape whose longitudinal direction coincides with the north-south direction when viewed from above, determination unit 13 can more easily and reliably perform the above-described determination by using the shape and orientational relationship of the housing complex detected from above.

Now, FIG. 4 is referenced again. When the housing complex reached based on the position of drone 10 is determined to be the housing complex that includes the target dwelling unit, specifying unit 14 specifies the position of the target dwelling unit in the housing complex based on the positional information acquired by acquisition unit 11.

Figure 6:
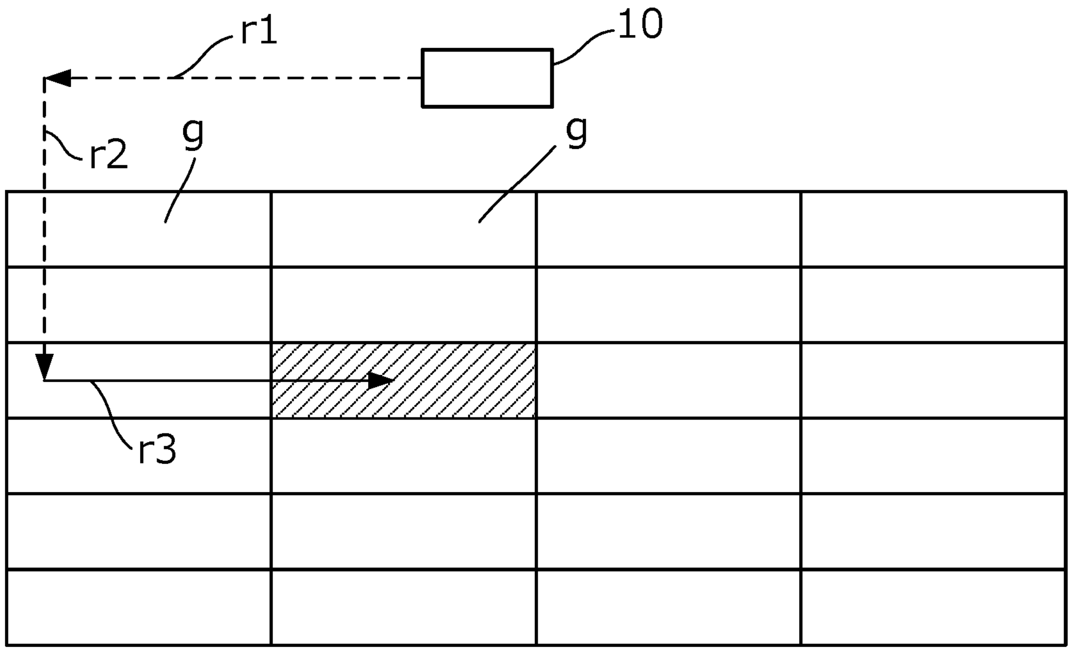
FIG. 6 is a side view illustrating the shape of the housing complex that includes the target dwelling unit that is the destination of drone 10 according to one embodiment.

Here, FIG. 6 is a side view illustrating the shape of the housing complex that includes the target dwelling unit that is the destination of drone 10, observed from a side of the housing complex. In FIG. 6, one of dwelling units g included in housing complex G is target dwelling unit gp (the hatched portion in the figure) corresponding to the destination of drone 10. Specifying unit 14 specifies the position of the target dwelling unit by counting the dwelling units included in the housing complex in the horizontal direction and the vertical direction based on the positional information acquired by acquisition unit 11. The aforementioned shape information includes information regarding the shape of each dwelling unit, and therefore, specifying unit 14 can count the dwelling units by specifying each dwelling unit in the detection results obtained by detecting the shape thereof in the housing complex, based on the shape information.

At this time, specifying unit 14 specifies the position of the target dwelling unit with reference to a position where there is no continuity of dwelling units in the housing complex. The position where there is no continuity of dwelling units in the housing complex is, for example, a position corresponding to the upper end, the lower end, the left end, or the right end of the housing complex. Furthermore, in this case, specifying unit 14 specifies the position of the target dwelling unit with reference to the position that reduces the amount or load of the processing performed to specify the target dwelling unit. For example, if the target dwelling unit is located near an end of the housing complex, the position of the target dwelling unit is specified with reference to the end.

In the example in FIG. 6, target dwelling unit gp is located on the fourth floor in six-story housing complex G, and therefore, the position that reduces the amount or load of the processing performed to specify target dwelling unit gp by counting dwelling units g is the position corresponding to the upper end (i.e., the rooftop) of housing complex G. In addition, in this housing complex G, target dwelling unit gp is located near the left end of the drawing sheet, and therefore the position that reduces the amount or load of the processing to be performed to specify target dwelling unit gp by counting dwelling units g is the position corresponding to the left end of housing complex G on the drawing sheet. In such a case, drone 10 first moves from above housing complex G toward the left end thereof (arrow r1 in the figure), and when it is determined that drone 10 has reached the left end based on the result of the detection by sensors 1008, drone 10 counts dwelling units g while continuing to lower the altitude thereof to move vertically downward (downward on the drawing sheet) (arrow r2 in the figure). At this time, specifying unit 14 can detect the external shape of each dwelling unit based on the aforementioned shape information, and therefore, specifying unit 14 counts dwelling units g based on the detected shapes. When specifying unit 14 finishes counting two dwelling units from the upper end of the housing complex and drone 10 reaches the altitude corresponding to the position of the third dwelling unit, specifying unit 14 next counts dwelling units g while drone 10 moves horizontally (to the right on the drawing sheet) (arrow r3 in the figure), keeping the altitude at the same level. Also at this time, specifying unit 14 can detect the external shape of each dwelling unit based on the aforementioned shape information, and therefore, specifying unit 14 counts dwelling units g based on the detected shapes. Thereafter, when specifying unit 14 finishes counting one dwelling unit from the left end of the housing complex and drone 10 reaches the position corresponding to the position of the second dwelling unit, specifying unit 14 specifies the dwelling unit at the position as the target dwelling unit.

In parallel with the specification processing performed by specifying unit 14, determination unit 13 may compare the detection result of sensors 1008 detecting the shape of the housing complex reached by drone 10 from a side of the housing complex with the shape information acquired by acquisition unit 11, to determine whether or not the housing complex is the housing complex that includes the target dwelling unit that is the destination of drone 10. That is to say, determination unit 13 may compare the shape that can be observed from above the housing complex and the shape that can be observed from the side of the housing complex with the shape information prepared in advance, to more reliably determine whether or not the housing complex is the housing complex that includes the target dwelling unit that is the destination of drone 10.

Figure 7:
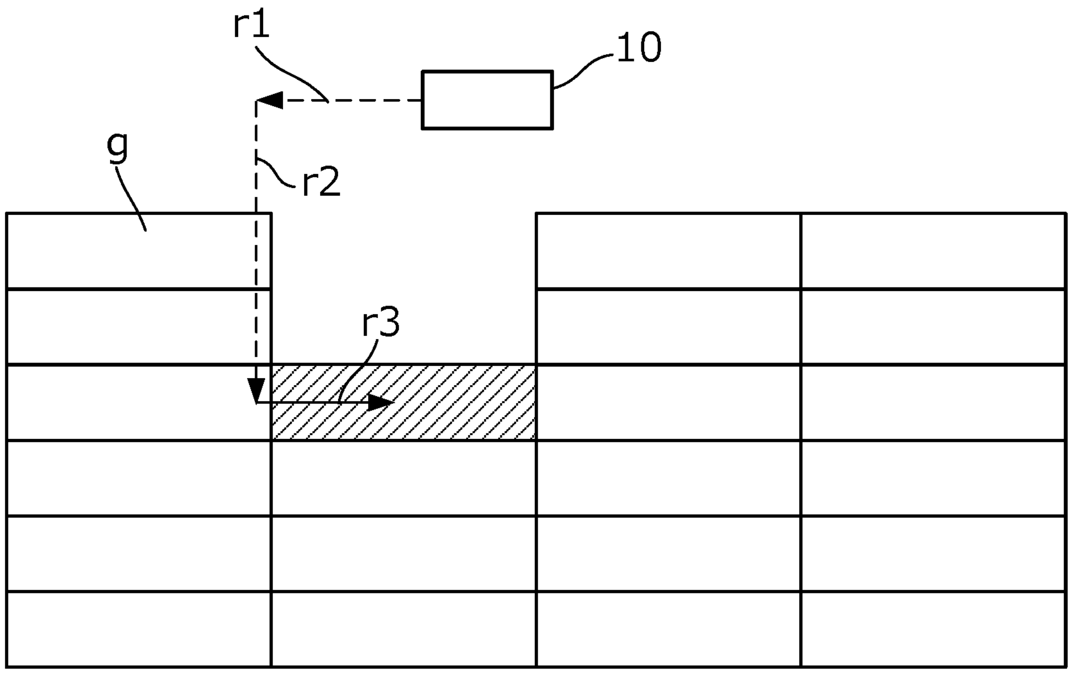
FIG. 7 is a side view illustrating the shape of the housing complex that includes the target dwelling unit that is the destination of drone 10.

In addition, there are cases in which the side view illustrating the shape of the housing complex that includes the target dwelling unit that is the destination of drone 10, observed from a side of the housing complex, is as shown in FIG. 7. In the example in FIG. 7, target dwelling unit gp (the hatched portion in the figure) is located on the fourth floor in six-story housing complex G, which is the top floor as there are no other dwelling units vertically above target dwelling unit gp. In this case, to reduce the amount or load of the processing performed to specify target dwelling unit gp by counting dwelling units g, drone 10 first moves from above housing complex G toward the left end thereof (arrow r1 in the figure), and when it is determined that the number of stories of the housing complex has changed from four stories to six stories based on the result of the detection by sensors 1008, drone 10 counts dwelling units g while continuing to lower the altitude thereof to move vertically downward (downward on the drawing sheet) (arrow r2 in the figure). Thereafter, when specifying unit 14 finishes counting two dwelling units from the upper end of the sixth story of the housing complex and drone 10 reaches the altitude corresponding to the position of the third dwelling unit, drone 10 moves horizontally (to the right on the drawing sheet) (arrow r3 in the figure) while keeping the altitude at the same level, and when drone 10 reaches the position corresponding to the position of the first dwelling unit, specifying unit 14 specifies the dwelling unit at the position as the target dwelling unit.

The position where there is no continuity of dwelling units in the housing complex is not limited to the upper end, the lower end, the left end, or the right end of the housing complex, and may be, for example, a position where there is a distinctive shape, equipment, or design in the external appearance of the housing complex.

Figure 8:
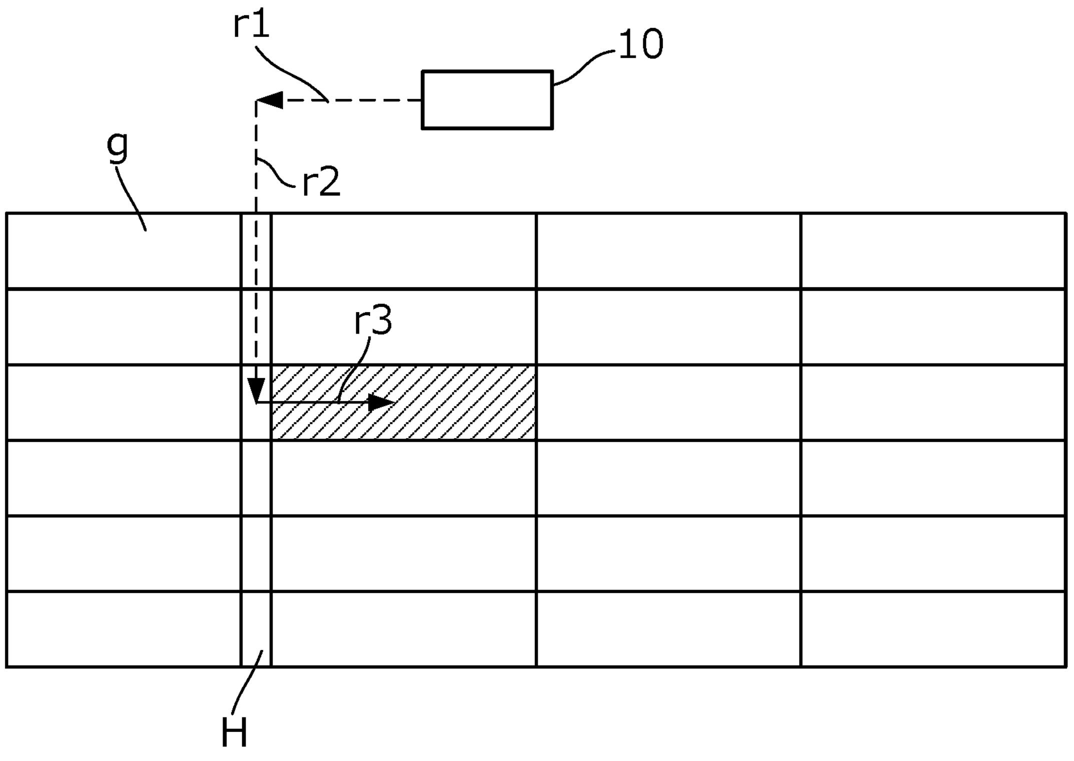
FIG. 8 is a side view illustrating the shape of the housing complex that includes the target dwelling unit that is the destination of drone 10.

For example, there are cases in which the side view illustrating the shape of the housing complex that includes the target dwelling unit that is the destination of drone 10, observed from a side of the housing complex, is as shown in FIG. 8. In the example in FIG. 8, target dwelling unit gp (the hatched portion in the figure) in six-story housing complex G is located on the fourth floor as in the example in FIG. 6, but the difference from FIG. 6 is that characteristic structure H is provided between dwelling units. In this case, to reduce the amount or load of the processing performed to specify target dwelling unit gp by counting dwelling units g, drone 10 first moves from above housing complex G toward the left end thereof (arrow r1 in the figure), and when it is determined that there is structure H based on the result of the detection by sensors 1008, drone 10 counts dwelling units g while continuing to lower the altitude thereof to move vertically downward (downward on the drawing sheet) (arrow r2 in the figure). Thereafter, when specifying unit 14 finishes counting two dwelling units from the upper end of the sixth story of the housing complex and drone 10 reaches the altitude corresponding to the position of the third dwelling unit, drone 10 moves horizontally (to the right on the drawing sheet) (arrow r3 in the figure) while keeping the altitude at the same level, and when drone 10 reaches the position corresponding to the position of the first dwelling unit, specifying unit 14 specifies the dwelling unit at the position as the target dwelling unit. As a result, compared to the example in FIG. 6, the amount or load of the processing performed to specify target dwelling unit gp is reduced.

In the above description, specifying unit 14 specifies the position of the target dwelling unit by counting the dwelling units included in the housing complex one by one in the horizontal direction and the vertical direction based on the positional information acquired by acquisition unit 11. However, instead of the method of counting the dwelling units, a distance-based method may be used. For example, specifying unit 14 may specify the position of the target dwelling unit by determining that the position that is X m vertically downward from the upper end of the housing complex and Y m to the right from the left end of the housing complex is the position of the target dwelling unit. In other words, specifying unit 14 may specify the position of the target dwelling unit based on the positional information acquired by acquisition unit 11 by using the distances detected in the housing complex in the horizontal direction and in the vertical direction.

Now, FIG. 4 is referenced again. When the target dwelling unit that is the destination of drone 10 is specified, extraction unit 15 extracts the landing position at which drone 10 is to land in the target dwelling unit, using a so-called image pattern matching technique or the like based on an image of the target dwelling unit captured by sensor 1008 (here, an image sensor, for example). The landing position mentioned here is any of a variety of shapes or equipment where drone 10 can reach from the outside, such as a balcony, an entrance, or a bay window, and is likely to be provided in a typical dwelling unit.

Thereafter, landing control unit 16 controls flight drive mechanism 1009 to enable drone 10 to land at the landing position extracted by extraction unit 15.

Operations

Figure 9:
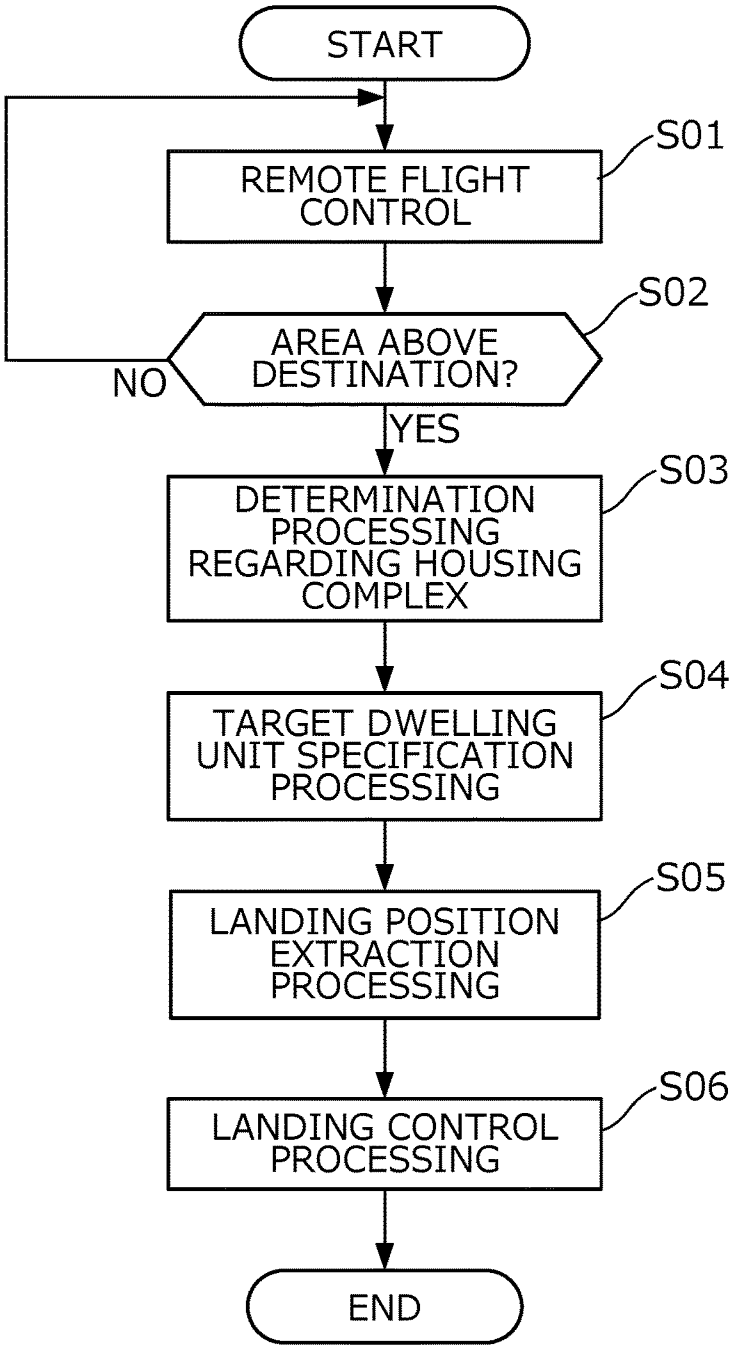
FIG. 9 is a flowchart illustrating processing steps performed by drone 10.

Next, processing performed when drone 10 flies will be described with reference to the flowchart shown in FIG. 9. In FIG. 9, drone 10 starts flying from the departure and arrival point toward the destination (step S01). Thereafter, drone 10 flies under the control of server apparatus 50 based on the position measured by positioning apparatus 1007, to an area above the position corresponding to the destination address designated when the delivery of the package was requested.

When drone 10 reaches the area above the position that is the destination (step S02; YES), determination processing is performed by determination unit 13 (step S03). In other words, determination unit 13 determines whether or not the housing complex reached by drone 10 is the housing complex that includes the target dwelling unit that is the destination of drone 10 by comparing the result of the detection by sensors 1008 regarding the shape of the housing complex reached by drone 10 based on the position of drone 10 with the shape information acquired by acquisition unit 11.

When the housing complex reached based on the position of drone 10 is determined to be the housing complex that includes the target dwelling unit, specification processing is performed by specifying unit 14 (step S04). In other words, specifying unit 14 specifies the position of the target dwelling unit in the housing complex based on the positional information acquired by acquisition unit 11. Note that, in parallel with the specifying processing performed by specifying unit 14, determination unit 13 may compare the detection result of sensors 1008 detecting the shape of the housing complex reached by drone 10 from a side of the housing complex with the shape information acquired by acquisition unit 11, to determine whether or not the housing complex is the housing complex that includes the target dwelling unit that is the destination of drone 10.

When the position of the target dwelling unit in the housing complex is specified by specifying unit 14, extraction processing is performed by extraction unit 15 (step S05). In other words, extraction unit 15 extracts the landing position at which drone 10 is to land in the target dwelling unit, based on an image of the target dwelling unit captured by sensor 1008.

Thereafter, landing control unit 16 controls flight drive mechanism 1009 to enable drone 10 to land at the landing position extracted by extraction unit 15 (step S06). When the landing is successful, drone 10 notifies server apparatus 50 of the successful landing, and server apparatus 50 notifies user terminal 30 of the successful landing.

According to the above-described embodiment, it is possible to enable drone 10 to land at various target dwelling units designated as destinations, without installing dedicated equipment at the destinations to enable drone 10 to land.

Modifications

The present invention is not limited to the above-described embodiment. The above-described embodiment may be modified as described below. In addition, two or more of the modifications described below may be implemented in combination.

Modification 1

Extraction unit 15 that extracts a landing position may extract a different landing position depending on whether or not a person is present in the target dwelling unit. For example, if a person is present in the target dwelling unit, the entrance may be extracted as the landing position from the point of view of ease of user access, and if no person is present in the target dwelling unit, the balcony may be extracted as the landing position from the point of view of security for the package. For example, whether or not a person is present in the target dwelling unit may be determined by the following method: server apparatus 50 notifies user terminal 30 when drone 10 reaches the housing complex, and if the user responds to this notification using user terminal 30 to indicate that the user is at home, it is determined that the user is at home, and if there is no such response, it is determined that the user is absent. Another conceivable method is a method of comparing the position of user terminal 30 and the position of the target dwelling unit. Yet another conceivable method is as follows: when a person is present in the target dwelling unit, for example, server apparatus 50 notifies user terminal 30 when drone 10 reaches the housing complex, and if the user opens a window of the target dwelling unit in response to this notification, extraction unit 15 extracts a point inside the window as the landing position, and if no person is present in the target dwelling unit, the balcony is extracted as the landing position from the point of view of security. In these cases, storage unit 12 of drone 10 stores correspondence relationships between whether or not a person is present in the target dwelling unit and landing positions, and extraction unit 15 extracts the landing position based on this stored content. According to this modification, it is possible to enable drone 10 to land at an appropriate landing position according to whether or not a person is present in the target dwelling unit.

Extraction unit 15 may extract a different landing position depending on the aforementioned shape information or positional information. For example, if it is determined that there is no balcony based on the shape of the housing complex, the entrance that can be accessed by the user may be extracted as the landing position, and if it is determined that there is a balcony based on the shape of the housing complex, the balcony may be extracted as the landing point from the point of view of security for the package. In addition, if the target dwelling unit is located on the first floor, the balcony may be extracted as the landing position from the point of view of security, and if the target dwelling unit is located on or above the second floor, the entrance that can be easily accessed by the user may be extracted as the landing position, for example. In these cases, storage unit 12 of drone 10 stores correspondence relationships between the characteristics of the housing complex or the target dwelling unit specified based on shape information or positional information and landing positions, and extraction unit 15 extracts the landing position based on this stored content. According to this modification, it is possible to enable drone 10 to land at an appropriate landing position according to the characteristics of the housing complex or the target dwelling unit.

Modification 2

Landing control for the drone may be realized using so-called edge computing (control by the drone) described in the embodiment, cloud computing (control by the server apparatus), or the cooperation of both (control by the drone and the server apparatus). Therefore, the control apparatus according to the present invention may be included in server apparatus 50.

Modification 3

The above embodiment is described based on an example in which a flight vehicle (drone 10) that transports a package lands at a destination. However, the present invention is applicable to the landing of a flight vehicle in a scene where the flight vehicle lands at a destination without holding a package, and then takes off to the next destination with a package received and held at the landing position. In addition, the flight purpose or use of the flight vehicle is not limited to transporting a package as illustrated in the embodiment, but may be any other purpose, such as measuring or photographing some sort of object. In other words, the present invention is applicable to the landing of the flight vehicle, regardless of the flight purpose or use of the flight vehicle. In addition, the flight vehicle is not limited to what is called a drone, and may have any shape or mechanism as long as it is a flight vehicle.

Modification 4

In the above-described embodiment, an image sensor that serves as an image capturing means included in sensors 1008 of drone 10 is used to detect a shape and a landing position. The method for detecting a shape and a landing position is not limited to the example in the embodiment, and any method capable of sensing the position, shape, or size of the object, such as the technology called LiDAR (Light Detection and Ranging, Laser Imaging Detection and Ranging) or the technology called SLAM (Simultaneous Localization and Mapping), can be used.

Other Modifications

The block diagrams used in the description of the above embodiment show blocks in functional units. These functional blocks (components) are realized by a combination of hardware and/or software. Furthermore, there are no particular limitations on the means for realizing the functional blocks. In other words, the functional blocks may be realized by one physically and/or logically combined apparatus, or a plurality of physically and/or logically separated apparatuses that are connected directly and/or indirectly (for example, in a wired and/or wireless manner). For example, the functions of user terminals 30 to 32 illustrated in the embodiment may be provided in one computer. In short, each of the functions illustrated in FIG. 4 may be provided in any of the apparatuses constituting drone management system 1, which is an information processing system. For example, if server apparatus 50 can directly control drone 10, server apparatus 50 may be provided with a function equivalent to the processing unit, and directly restrict the flight of drone 10.

The aspects/embodiments described in the present description may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-Wide Band), or Bluetooth (registered trademark), or another appropriate system, and/or a next-generation system that is an extension of any of these systems.

The orders in the processing procedures, sequences, flowcharts, and the like of the aspects/embodiments described in the present description may be changed as long as no contradictions arise. For example, the methods described in the present description show various step elements in an exemplified order, and are not limited to the specific order that is shown. The aspects/embodiments described in the present description may be used alone or in combination, or may be switched when they are implemented. Furthermore, the notification of predetermined information (e.g., notification of "being X") is not limited to being performed explicitly, and may also be performed implicitly (for example, notification of the predetermined information is not performed).

The information and the parameters described in the present description may also be expressed as absolute values, relative values with respect to a predetermined value, or another type of information corresponding thereto.

The term "determining" used in the present description may include various types of operations. For example, the term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The present invention may be provided as an information processing method or a program. This program may be provided in a mode of being recorded on a recording medium such as an optical disk, or may be provided in a mode of being downloaded to a computer via a network such as the Internet and being installed in the computer to become usable, for example.

Software, instructions, and the like may also be transmitted/received via a transmission medium. For example, if software is transmitted from a web site, a server, or another remote source using a wired technology such as a coaxial cable, an optical fiber cable, a twisted pair wire, or a digital subscriber line (DSL), and/or a wireless technology using infrared light, radio waves, microwaves, or the like, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that can be mentioned throughout the entire description above may also be expressed by an electric voltage, an electric current, an electromagnetic wave, a magnetic field or a magnetic particle, an optical field or a photon, or a combination thereof.

All references to elements that have been given names such as "first" and "second" in the present description do not overall limit the number of such elements or the orders thereof. Such names may be used in the present description as a convenient method for distinguishing between two or more elements. Accordingly, references to first and second elements are not intended to mean that only two elements can be employed, or that the first element is required to come before the second element in some sort of manner.

The "means" in the configurations of the above-described apparatuses may be replaced with "unit", "circuit", "device", or the like.

The terms "including", "comprising", and variations thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments described in the present description. The present invention can be implemented as corrected and modified aspects without departing from the spirit and scope of the present invention that are defined by the description of the claims. Accordingly, the present description aims to illustrate examples and is not intended to restrict the present invention in any way.

REFERENCE SIGNS LIST

1: Drone Management System
10: Drone
11: Acquisition Unit
12: Storage Unit
13: Determination Unit
14: Specifying Unit
15: Extraction Unit
16: Landing Control Unit
30: User Terminal
40: Wireless Communication Network
50: Server Apparatus
1001: Processor
1002: Memory
1003: Storage
1004: Communication Apparatus
1005: Input Apparatus
1006: Output Apparatus
1007: Positioning Apparatus
1008: Sensor
1009: Flight Drive Mechanism
50: Server Apparatus
5001: Processor
5002: Memory
5003: Storage
5004: Communication Apparatus

The invention claimed is:

1. An information processing apparatus comprising:
a sensor configured to detect a shape of a housing complex including a plurality of dwelling units and to provide a detection result; and
a processor configured to:
acquire shape information on a shape of a housing complex including a target dwelling unit that is a destination of a flight vehicle, and location information on a location of the target dwelling unit in the housing complex;
determine, by comparing the detection result provided by the sensor detecting a shape of a housing complex reached by the flight vehicle based on positioning of the flight vehicle with the shape information acquired by the processor, whether the reached housing complex is the housing complex including the target dwelling unit;
specify, upon determining that the reached housing complex is the housing complex including the target dwelling unit, the location of the target dwelling unit in the reached housing complex based on the location information acquired by the processor; and
control a flight route of the flight vehicle to land at a landing position at the specified location of the target dwelling unit;
wherein the processor specifies the location of the target dwelling unit by counting dwelling units included in the reached housing complex individually while controlling the flight vehicle to move in a horizontal direction and in a vertical direction based on the location information acquired by the processor from a reference position.

2. The information processing apparatus according to claim 1,
wherein the processor specifies the location of the target dwelling unit by using distances detected in the reached housing complex in the horizontal direction and in the vertical direction based on the location information acquired by the processor from the reference position.

3. The information processing apparatus according to claim 1,
wherein the processor specifies the location of the target dwelling unit with reference to the reference position at a location at an end of consecutive dwelling units in the reached housing complex.

4. The information processing apparatus according to claim 1,
wherein the processor specifies the location of the target dwelling unit by counting consecutive dwelling units included in the reached housing complex with reference to the reference position being a location at one of an end of the consecutive dwelling units or at a characteristic structure provided in the reached housing complex such that an amount or load of processing performed to specify the target dwelling unit is reduced by minimizing a number of consecutive dwelling units that are counted.

5. The information processing apparatus according to claim 1, further comprising the processor configured to:
extract a landing position from the specified location of the target dwelling unit.

6. The information processing apparatus according to claim 5,
wherein the processor extracts a different landing position depending on whether a person is present in the target dwelling unit.

7. The information processing apparatus according to claim 5,
wherein the processor extracts a different landing position depending on the shape information or the location information.

8. The information processing apparatus according to claim 1,
wherein the processor:
determines whether the reached housing complex is the housing complex including the target dwelling unit by comparing a first of the detection result provided by the sensor from an above view of the shape of the reached housing complex with the shape information acquired by the processor; and
determines whether the reached housing complex is the housing complex including the target dwelling unit by comparing a second of the detection result provided by the sensor from a side view of the shape of the reached housing complex with the shape information acquired by the processor.

* * * * *